(12) United States Patent
Basso et al.

(10) Patent No.: US 6,370,119 B1
(45) Date of Patent: Apr. 9, 2002

(54) COMPUTING THE WIDEST SHORTEST PATH IN HIGH-SPEED NETWORKS

(75) Inventors: Claude Basso, Nice (FR); Paolo Scotton, Ruschlikon (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/036,354

(22) Filed: Mar. 6, 1998

(30) Foreign Application Priority Data

Feb. 27, 1998 (EP) .......................................... 98480011

(51) Int. Cl.[7] .............................................. G01R 31/08
(52) U.S. Cl. ...................................................... 370/252
(58) Field of Search ................................ 370/252, 338, 370/401, 392, 229, 254, 400, 408, 256, 351, 238, 248, 360, 235; 340/426, 438, 825.34; 716/18; 710/104, 131, 8–10; 709/241

(56) References Cited

U.S. PATENT DOCUMENTS

| | | | | |
|---|---|---|---|---|
| 5,142,531 A | * | 8/1992 | Kirby ......................... | 370/254 |
| 5,748,486 A | * | 5/1998 | Ashar et al. .................. | 716/18 |
| 5,754,543 A | * | 5/1998 | Seid ............................ | 370/256 |
| 5,870,564 A | * | 2/1999 | Jensen et al. ................ | 370/360 |
| 6,016,306 A | * | 2/1999 | Le Boudec et al. ......... | 370/235 |
| 6,044,075 A | * | 3/2000 | Le Boudec et al. ......... | 370/351 |
| 6,078,575 A | * | 6/2000 | Dommety .................... | 370/338 |
| 6,094,687 A | * | 7/2000 | Drake, Jr. et al. .......... | 709/241 |

* cited by examiner

*Primary Examiner*—Wellington Chin
*Assistant Examiner*—Prenell Jones
(74) *Attorney, Agent, or Firm*—Cesari and McKenna, LLP

(57) ABSTRACT

A method and system is described for determining the optimal path for routing a communication in a communication network between a source node and at least one destination node. The determination is based upon evaluation of the path offering the widest bandwidth in the direction of data transmission, the lowest additive cost, and the lowest hop count. Each link of the network is associated with at least a restrictive cost and an additive cost reflecting selected link characteristics. A path is characterized by a restrictive cost and an additive cost derived from the link costs of its component links. A connection to be routed identifies a source node, a destination node and a maximum restrictive cost allowed for routing the connection. All acceptable paths from the source node to all the other nodes of the network are determined and stored. These paths deemed acceptable and are stored if they have the lowest restrictive cost that allows the routing of the connection, and if they have the lowest additive cost and minimum hop count. Finally, from the plurality of stored acceptable paths, the path that originates from the source node and terminates at the destination node is selected as the optimal path to route the connection.

14 Claims, 9 Drawing Sheets

COMPUTING THE WIDEST SHORTEST PATH IN HIGH-SPEED NETWORKS

TECHNICAL FIELD

This invention relates high-speed packet switching networks and more particularly, to optimum path selection for connections between two nodes in such systems.

BACKGROUND ART

It has become increasingly useful to interconnect a plurality of data processing elements by means of a packet switching network in which data is transmitted as data assemblages called "packets". Such networks include a plurality of interconnected switching nodes which, in turn, are connected to end nodes supporting data processing devices. Such packet networks can become quite large with an extensive geographical distribution. In such a situation, the selection of an efficient path between two end nodes which wish to communicate with each other becomes of paramount importance.

Typical methods for optimum path selection use a so-called additive cost approach to compute the shortest path. A given cost or weight is associated to each link of the network. The shortest path from a source node to a destination node will be the path having the smallest cumulative cost, i.e., the smallest sum of the costs of all the links of the path. Examples of typical cost criteria in this approach are the minimum hop count and the minimum path length. The hop count is the number of links used to construct the path between the two end nodes. The path length is a function of the overall transmission delay imposed by the path between the two end nodes. In high-speed packet switching networks, the computing of the shortest path in terms of delay and hop count is a typical problem which must be solved in order to minimize as much as possible the transmission delay and jitter between the two end nodes. This is particularly important for connections related to classes of service with real-time constraints such as video or voice. This problem is known in graph theory as the "single-source shortest path" problem. Several algorithms have been used in the prior art to solve this problem. Such algorithms are disclosed in "Introduction to Algorithms" by T. H. Cormen, C. E. Leiserson and R. L. Rivest, The MIT Press. Classical relaxation algorithms may be used, such as the so-called Dijkstra algorithm, the so-called Bellman-Ford algorithm, or a modified Bellman-Ford algorithm as disclosed in U.S. Pat. No. 5,233,604 to Ahmadi. These algorithms are widely used as they can be rapidly executed. Other algorithms have also been used which rely on linear programming methods, such as the so-called simplex algorithm, the so-called ellipsoid algorithm or the so-called Karmarkar algorithm. However, these linear programing algorithms are rarely used for solving path selection problems as they may have longer execution times.

With emerging standards such as the PNNI routing standard from the ATM Forum defined in "Private Network-Network Interface Specification Version 1.0", Letter Ballot, March 1996, the problem of finding the shortest path has significantly changed. Now, the network administrator i.e. the person in charge of the network administration, can define for each link of the network an administrative weight (AW) which is actually an additive cost. This administrative weight is traditionally an integer value associated to each link of the network. The network administrator may set different values for this AW in order in order to privilege one path among others. As already stated, if a path is computed which comprises n hops, then the total AW of the path is the algebraic sum of the AW of the n links traversed. An interesting feature for tuning network performance is to define the shortest path not only as a function of the hop count but also in terms of the cumulative administrative weight of the path.

The PNNI standard also defines the maximum and available bandwidths specified for each link. It is helpful, in order to provide load balancing in the network, to take into account bandwidth parameters in the path selection algorithm and to select, among the shortest available paths, the path providing the "widest" bandwidth. Here again, several methods have been proposed in the prior art. For example, PCT patent application No. PCT/EP94/04159 filed on Dec. 15, 1995 and entitled "Method and apparatus for routing a communication in a network" discloses an algorithm that is a modification of the well-known Open Shortest Path First (OSPF) algorithm, which determines in a multi-dimensional manner a set of optimal paths with two-dimensional link costs. Multi-dimensional type algorithms have the disadvantage that they are complex and accordingly require significant processing power for fast execution.

The bandwidth characteristic of a link is typically a so-called restrictive cost; that is, the narrowest bandwidth segment (link) of the path will determine the overall path bandwidth. Furthermore the restrictive cost (e.g. available bandwidth) may be different when considering a path in one direction of transmission or the other. What is needed is a path selection algorithm that computes the best path taking into account both additive cost and restrictive cost, with the restrictive cost being dependent on the proposed direction of transmission. Furthermore, such an algorithm should be of a low complexity in order to executed rapidly while requiring low processing power. Such an algorithm is provided by the present invention.

SUMMARY OF THE INVENTION

It is an object of the present invention to provide a method and system for determining the best path for routing a connection through a high-speed packet switching network, with the determination being based upon restrictive and additive characteristics of the network links.

It is another object of the present invention to provide a method and system for determining the best path for a proposed connection in a high-speed packet switching network, with the determination being based upon evaluation of the path offering the widest bandwidth available for the direction of data transmission, the lowest additive cost, and the lowest hop count.

It is a further object of the present invention to provide a method and system to determine all the best paths to route data from a particular source node to all other nodes of a high-speed packet switching network, the determination of the paths being efficient with regard to consideration of both additive and restrictive links.

To achieve the foregoing objects the invention provides in one embodiment, a system for determining the optimal path for routing a communication between a source node and at least one destination node in a communication network comprising a plurality of nodes interconnected by a plurality of links. Each link of the network is associated with at least a restrictive cost and with an additive cost reflecting selected link characteristics. For a connection to be routed the system identifies a source node, a destination node and a maximum restrictive cost allowed for the connection. The system characterizes a path by a restrictive cost and an additive cost derived from the link costs of its component links. The system also determines and stores all the acceptable paths from the source node to all the other nodes of the network. Paths are considered acceptable if they have the lowest restrictive cost that is less than or equal to the maximum restrictive cost allowed by the connection, and if they have the lowest additive cost and minimum hop count. Finally, the system selects, as the optimal path for the connection, the path from the plurality of stored paths that originates from the source node and terminates at the destination node.

BRIEF DESCRIPTION OF THE DRAWINGS

A preferred embodiment of the invention will now be described with reference to the accompanying drawings, wherein.

DETAILED DESCRIPTION OF THE INVENTION

Figure 1:
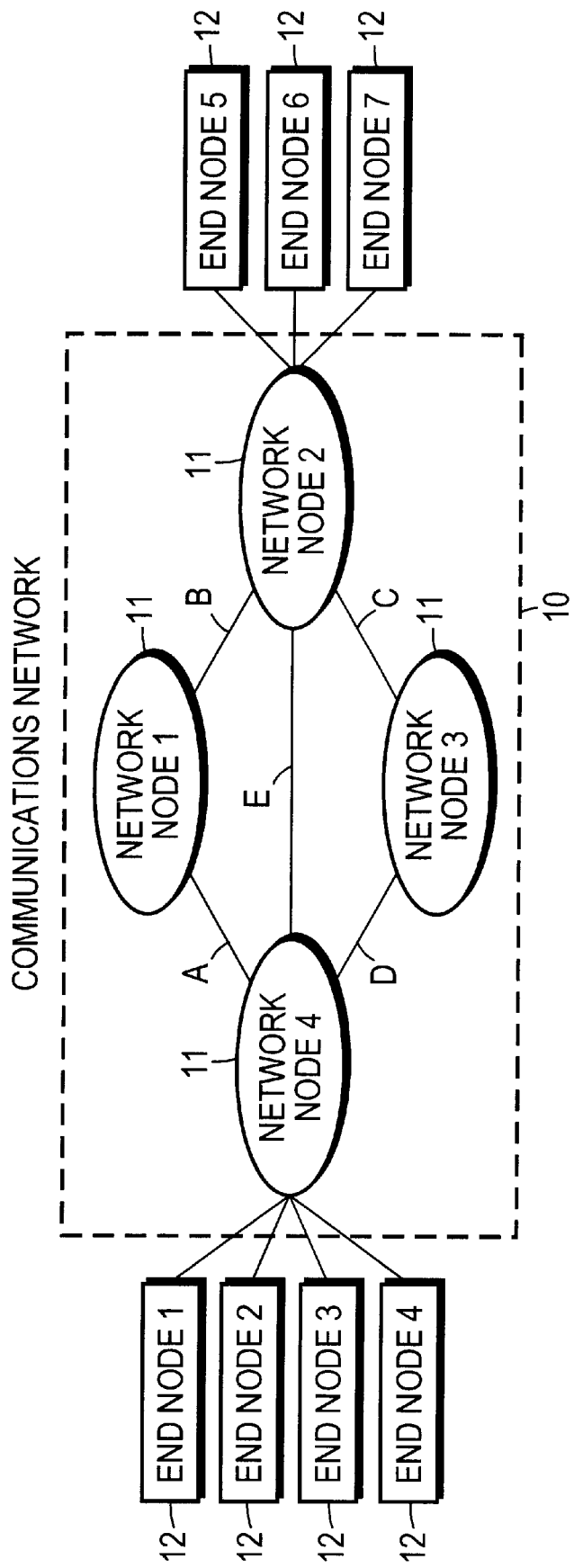
FIG. 1 shows a general block diagram of a packet communication network in which the route determination of the present invention can be used.

Referring more particularly to FIG. 1 there is shown a general block diagram of a packet transmission system comprising four network nodes 11 named Network Node 1 through Network Node 4. Each of network nodes 11 is linked to others of the network nodes 11 by one or more communication links A through E. Each communication link may be either a permanent connection or a selectively enabled (dial-up) connection. Any or all of network nodes 11 may be attached to end nodes 12, Network Node 2 being shown as attached to end nodes 5, 6 and 7, and Network Node 4 being shown as attached to end nodes 1, 2, 3 and 4. Network nodes 11 each comprise a data processing system which provides data communications services to all connected nodes, network nodes and end nodes, as well as to decision points with the node. The network nodes 11 each have one or more decision points at which incoming data packets are selectively routed on one or more of the outgoing communication links terminated within that node or at another node. Such routing decisions are made in response to information in the header of the data packet. The network nodes also provide directory services and maintenance of network topology databases used to support route calculations.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

Figure 2:
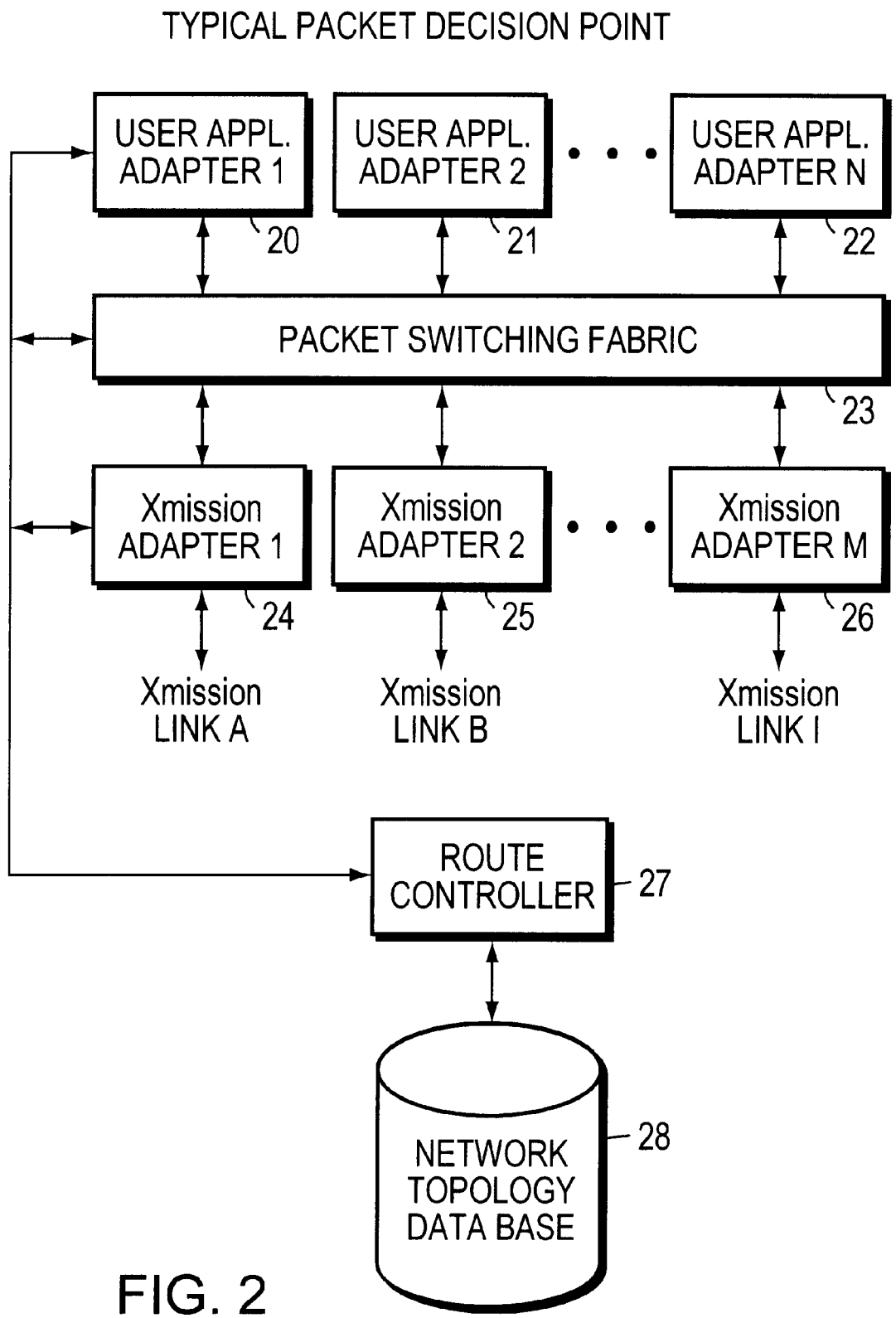
FIG. 2 shows a block diagram of a typical decision point at the entry point for packets entering the network of FIG. 1.

In FIG. 2 there is shown a general block diagram of a typical packet network decision point such as is found in the network nodes 11 of FIG. 1. The decision point of FIG. 2 comprises a high speed packet switching fabric 23 into which packets arriving at the decision point are entered. Such packets arrive over transmission links via transmission adapters 24, 25, 26, or originate in user applications in end nodes via application adapters 20, 21, 22. It should be noted that one or more of the transmission adapters 24–26 can be connected to intranode transmission links connected to yet other packet switching fabrics similar to fabric 23, thereby expanding the switching capacity of the node. The decision point of FIG. 2 thus serves to connect the packets arriving at the decision point to a local user (for end nodes) or to a transmission link leaving the decision point (for network nodes and remote end nodes). The adapters 20–22 and 24–26 may include queuing circuits for queuing packets before or after switching in fabric 23. A route controller 27 is used to calculate optimum routes through the network for packets originating at the decision point of FIG. 2. A topology database 28 contains information about all the nodes and transmission links of the network of FIG. 1, which information is used by controller 27 of FIG. 2 to calculate optimum paths.

The route controller 27 of FIG. 2 may be implemented in discrete digital circuitry but is preferably implemented in a programmed digital computer. Such a programmed computer can be used to generate headers for packets originating at user applications in or connected directly to the decision point of FIG. 2. The information in database 28 is updated when new links are activated, new nodes are added to the network, when links or nodes are dropped from the network or when link loads change significantly. Such information preferably originates at the network node to which the resources are attached and is exchanged with all other nodes to assure up-to-date topological information needed for route calculation. Such data can be carried on packets very similar to the information packets exchanged between end users of the network.

The incoming transmission links to the packet decision point of FIG. 2 may comprise links from local end nodes such as end nodes 12 of FIG. 1 or links from adjacent network nodes 11 of FIG. 1. In any case, the decision point of FIG. 2 operates in the same fashion to receive each data packet and forward it to another local or remote decision point as dictated by the information in the packet header. The packet network of FIG. 1 thus operates to enable communication between any two end nodes of FIG. 1 without dedicating any transmission or node facilities to that communication path except for the duration of a single packet. In this way, the utilization of the communication facilities of the packet network is optimized to carry significantly more traffic than would be possible with dedicated transmission links for each communication path.

A number of different characteristics of each link in the network are stored in the topology database 28 of FIG. 2. For the purposes of the present invention, only a few of these characteristics will be discussed. One of the critical characteristics of the transmission links is the bandwidth available. This characteristic can be split into forward available bandwidth and reverse available bandwidth based on the direction of propagation of data through the network. The bandwidth characteristic of a link is typically a so-called restrictive parameter as the overall bandwidth available for a given path is determined by the link in the path having the lowest bandwidth available, that is, the "bottleneck" link.

Another type of link characteristics are the so-called additive costs associated to each link, an example of which is path length. Path length is a function of the overall transmission delay imposed by the path between two end nodes. In most high speed networks, the delay (path length) is not a major consideration since the worst-case delay through such a network is nearly always acceptable. In the present embodiment of the invention the additive cost considered is the so-called administrative weight as defined in the PNNI standard. The administrative weight is a value set by the network operator. It is used to indicate the relative desirability of using a link or node for whatever reason significant to the network operator. Administrative weight is a required topology metric for all service categories. This is a dimensionless value, the default value of which is set to a particular value referred to as DefaultAdminWeight. A higher value describes a link or node which is less desirable for use. The administrative weight of a path is defined as the sum of the administrative weights of the links and nodes contained in the path. Both the available bandwidth and the administrative weight characteristics associated to each link of the network are stored in the topology database. For the purpose of simplification, the costs associated to each link will be referred hereinafter to as restrictive cost (forward and reverse) and additive cost, but it is clear that the terms restrictive cost and additive cost respectively shall be construed as encompassing any type of link characteristics that are respectively restrictive or additive in nature.

In accordance with the present invention, each connection request provides the following input parameters:

Source Node (i)

Destination Node (j)

Forward Restrictive Cost (FRC)

Reverse Restrictive Cost (RRC)

In a preferred embodiment of the invention, the forward and reverse restrictive costs are respectively inversely proportional to the forward and reverse bandwidths requested by the incoming connection. Using these parameters and taking into account the additive cost (e.g. the administrative weight) associated to each link of the network, the path determination process of the present invention determines the best path from the source node to the destination node, that is, the path that is widest in terms of restrictive cost and shortest in terms of additive cost while still satisfying the requested parameters of the proposed connection.

Figure 3:
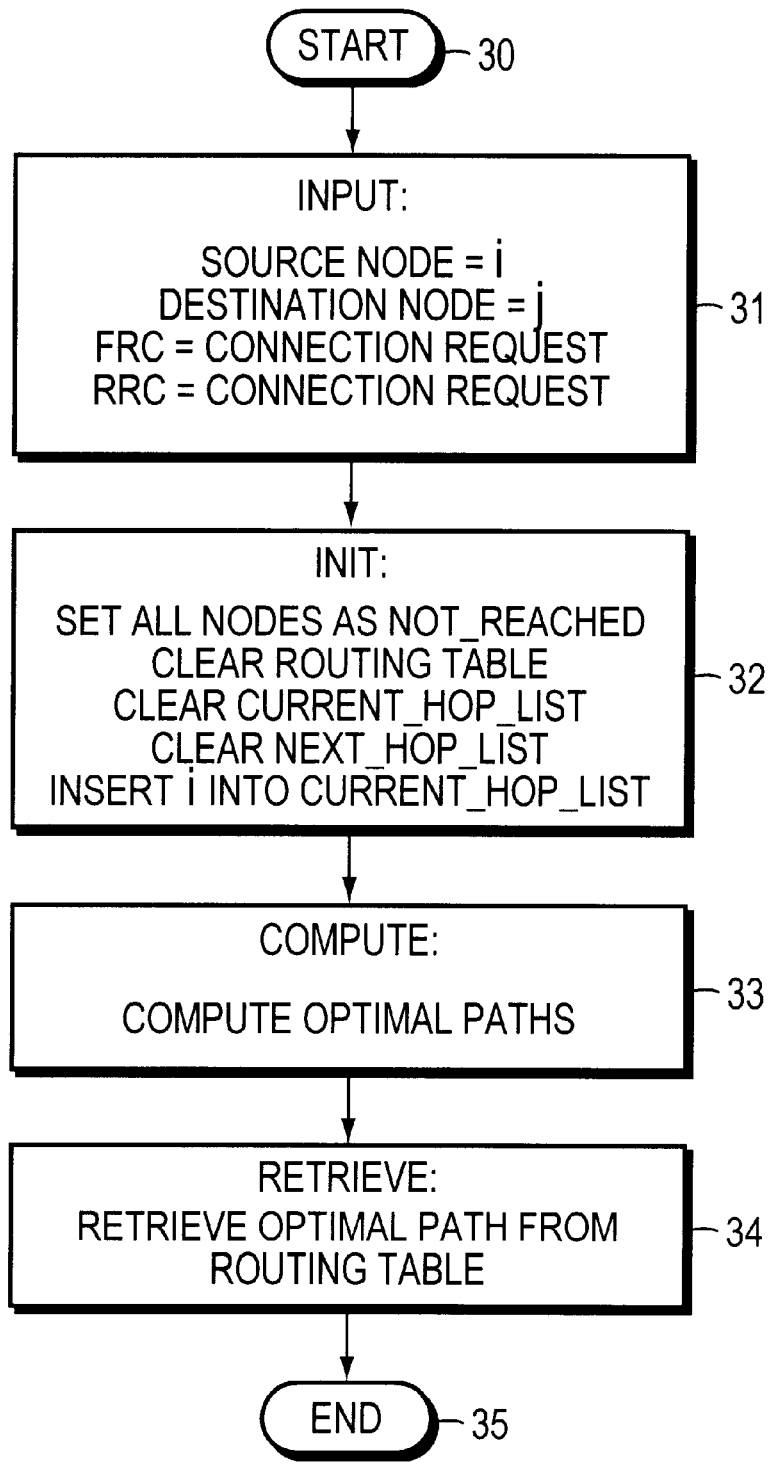
FIG. 3 shows a general flow chart of the path computation procedure of the present invention.

In FIG. 3, there is shown a general flow chart of the path computation procedure of the present invention. Starting at start box 30, input box 31 is entered to carry out the INPUT step whereby the inputs required to calculate an optimum route in accordance with the present invention are specified. These input parameters include the identity of the source node i, the identity of the destination node j, the requested connection forward restrictive cost (FRC), and the requested connection reverse restrictive cost (RRC). These input parameters are provided at each connection request. Note that the destination node j is required only to retrieve the optimum route towards that node since the algorithm of the invention computes the optimum route from the source node to all nodes in the network. With these inputs, initialization box 32 is entered to proceed with a set of initializations.

Each node of the network is set to as "Not_Reached" which means that the node has not been processed (Reached) yet by the path determination algorithm. This is implemented by associating a boolean variable Reached to each node as a node attribute which is set to "false" (i.e. zero) for all the nodes. Also in box 32, a table called routing table is cleared. The routing table can be defined as the data structure where the optimum route will be stored. This table has one entry for each node of the network. After computation of optimal paths is complete, the optimal path from the predefined source node to the predefined destination node will be retrieved from the routing table at the table entry corresponding to the destination node. The optimal path will be defined as a list of couples (node, link) that compose the path. The structure of the routing table will be detailed further with reference to FIG. 4.

Still in box 32, two lists used by the path determination procedure of the invention are also cleared. These lists are referred to as Current_Hop_List and Next_Hop_List. The lists Current_Hop_List and Next_Hop_List contain, respectively, the identification (ID) of nodes at current hop and the identification of nodes to be processed at next hop, these nodes being determined by starting with a hop that includes the source node. Then, a so-called breadth-first approach is used to progress hop by hop throughout the network, where a hop is a pair comprising one node and one link originating from that node. As shown in box 32, Current_Hop_List is initialized by source node i. After INIT step at box 32 is completed, box 33 is entered to carry out the COMPUTE step of the path determination procedure of the present invention. In this step, optimal paths from source node i to all other nodes of the network are computed. Details of how paths are computed will be described further with reference to FIG. 5. Still referring to FIG. 3, after optimal paths from source node i to all other nodes of the network have been computed, they are stored in the routing table which is associated with box 33. Subsequently, box 34 of FIG. 3 is entered to carry out the RETRIEVE step of the path determination procedure, for retrieving from the routing table the optimal path computed from source node i to destination node j. Finally, the process ends in terminal box 35.

Figure 4:
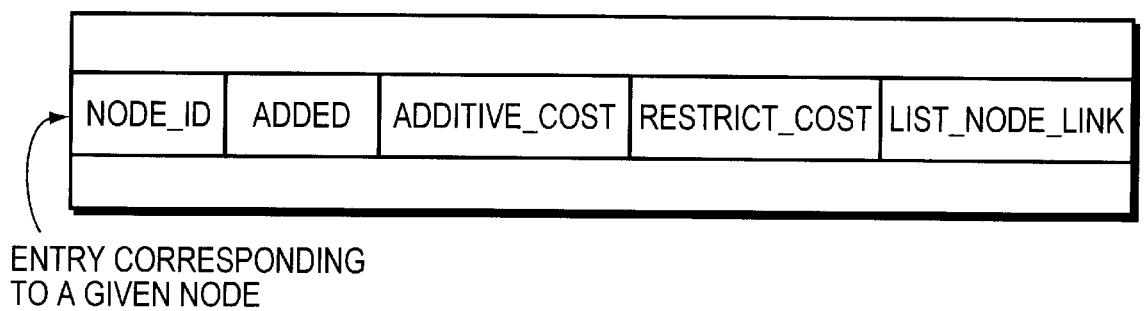
FIG. 4 shows the structure of the routing table used within the path computation procedure of FIG. 3.

FIG. 4 is a simplified diagram illustrating the structure of the routing table used in a preferred embodiment of the invention. Referring to FIG. 4, the routing table comprises one entry for one entry for each node of the network. Each entry comprises several data fields. The first field referred to as Node_ID contains an identification of the node associated to that entry. For example, if network nodes are numbered as in FIG. 1, the Node_ID field may contain numbers 1 through 4. A second field, Added, contains the value of a boolean variable that can take one of two values: "false" and "true" (i.e. zero or one). A false value means that no path has been found yet from source node (i) to the node identified in field Node_ID. A true value means a path has already been found from source node (i) to node Node_ID. A third field, Additive_Cost, contains the cumulative additive cost of the path computed from the source node (i) to the node associated to the entry considered, that is, the sum of the additive costs associated to the links included path.

The fourth field, Restrict_Cost, contains the overall restrictive cost of the path computed from the source node (i) to the node associated to the entry considered. This overall restrictive cost is calculated as the maximum of the symmetric restrictive costs associated to the links forming the path from the source node (i) to the node associated to the entry. The symmetric restrictive cost of a link is defined as the maximum value between the forward restrictive cost (FRC) and the reverse restrictive cost (RRC) associated to that link. This definition of the overall restrictive cost of a path is for illustrative purposes. Returning to FIG. 4, the last field, List_Node_Link, provides a list of couples of the type (node, link) defining the different hops that form the path from source node (i) to node Node_ID. The role of the routing table is to store the optimal paths computed at step COMPUTE (box 33) of the path determination procedure illustrated in FIG. 3.

Figure 5:
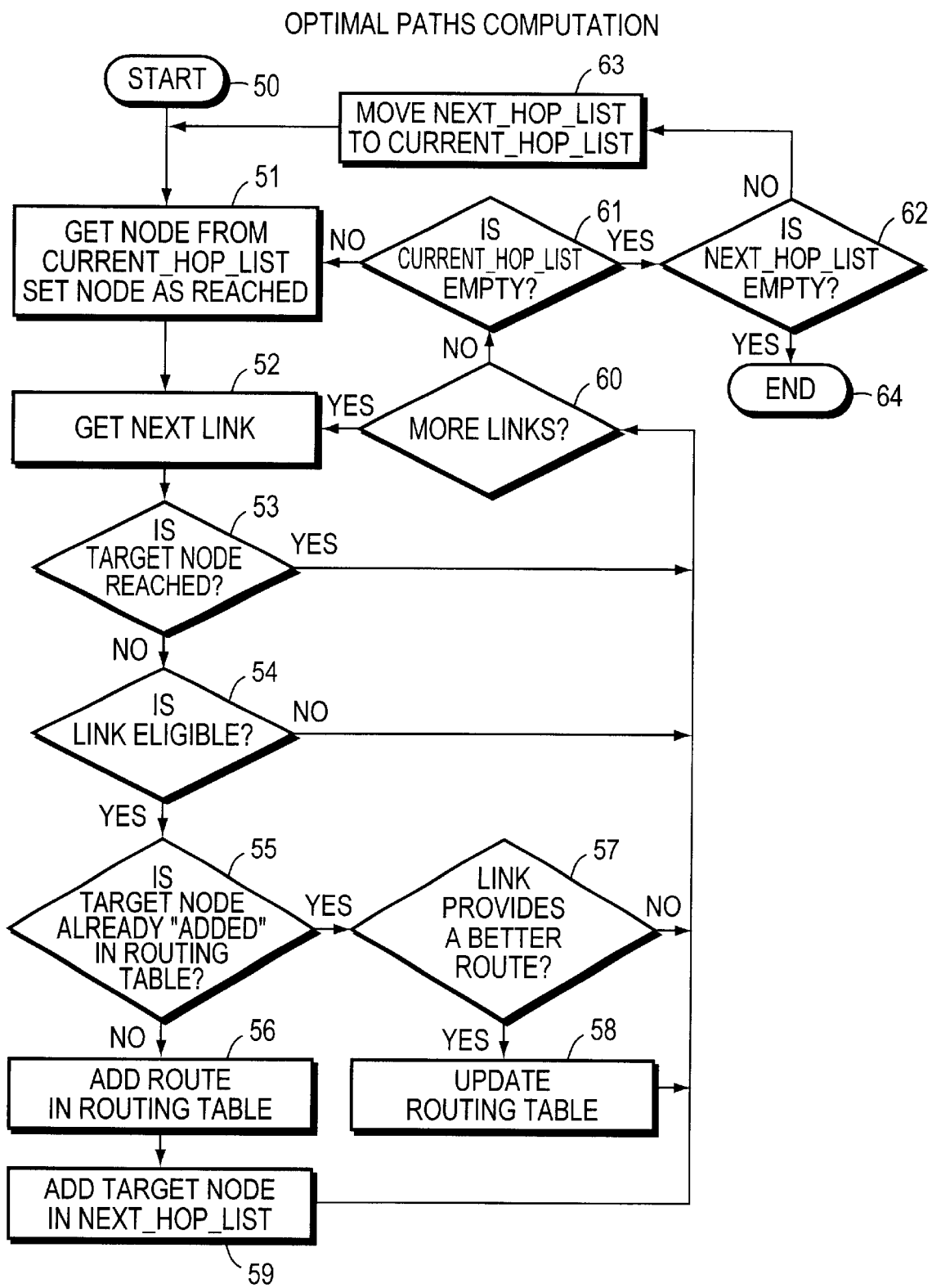
FIG. 5 shows a flow chart detailing the optimal paths computation step of FIG. 3.

Proceeding to FIG. 5, there is shown a flow chart detailing the optimal paths computation process (step COMPUTE) of the present invention. Referring to FIG. 5, starting at input box 50, box 51 is then entered to get first node identification (ID) stored in list Current_Hop_List. List Current_Hop_List was previously initialized at step INIT of FIG. 3 with the source node ID. Once the first node ID is retrieved from the list, it is removed from that list. Still in box 51, a "Reached" attribute of the current node is set to true (or one), meaning that the current node has been processed by the algorithm. Box 52 is then entered to retrieve, from the topology database, next link identifications (ID) of the network links originating from the current node. A list of links ID originating from each node of the network is found in the topology database. The algorithm starts with the first link ID in the list. The node at which a link terminates is called a "target node". For example, in the network of FIG. 1, a target node of link A is node 1. After a next link ID has been retrieved, decision box 53 is entered to determine whether the target node of "next link" has already been processed by the algorithm, that is, whether its "Reached" attribute is "true" or "false". If the "Reached" attribute is true, decision box 60 is entered to determine whether the topology database identifies more links originating at the current node.

Returning to box 53, if target node is not yet "reached", decision box 54 is entered to determine whether the link retrieved in box 52, is eligible or not. A link is "eligible" if it satisfies the restrictive costs requirements of the proposed connection. The "eligibility test" of a link will be further detailed with reference to FIG. 6. If the link is not eligible, decision box 60 is entered to determine whether the topology database identifies more links originating from the current node. If the current link is eligible, decision box 55 is entered to determine whether the target node of the current link is already "added" (Added=true) in the routing table, meaning that a path that does not use the current link has already been found from source node (i) to the target node of the current link (see description of FIG. 4). If the target node is already "added", decision box 57 is entered to determine whether the path, from source node (i) to target node using the current link, is better than the path already stored in routing table. Details on how the test represented by decision box 57 is performed are to be further described with reference to FIG. 7. If the current link provides a better route than the route already stored in routing table at an entry corresponding to target node ID, then box 58 is entered to update the routing table with the latter route before returning to box 60. Conversely, if the decision at box 57 is "no", then decision box 60 is directly entered. Further details on how the routing table is updated at box 58 are to be described with reference to FIG. 9. Proceeding with box 55, if the target node is not already added, box 56 is entered to add the current route, computed from source node (i) to target node through current link, to the routing table at an entry corresponding to the target node ID. Details on how that route is added to the routing table are further provided below with reference to FIG. 8. After box 56 is passed, box 59 is entered to insert the target node ID in next_Hop_List. Then, box 60 is entered again to determine whether the topology database identifies more links originating in current node. If so, box 52 is re-entered to retrieve the next link and the process continues as described above. If not, decision box 61 is entered to determine whether the Current_Hop_List is empty. If it is not empty, box 51 is re-entered and the process continues as described above. If Current_Hop_List is empty, decision box 62 is entered to determine whether list Next_Hop_List is empty or not. If not, box 63 is entered to move the contents of Next_Hop_List into Current_Hop_List after Next_Hop_List is found to be empty. The process recycles by entering box 51. Returning to box 62, if list Next_Hop_List is empty, then the process ends with terminal box 64.

Figure 6:
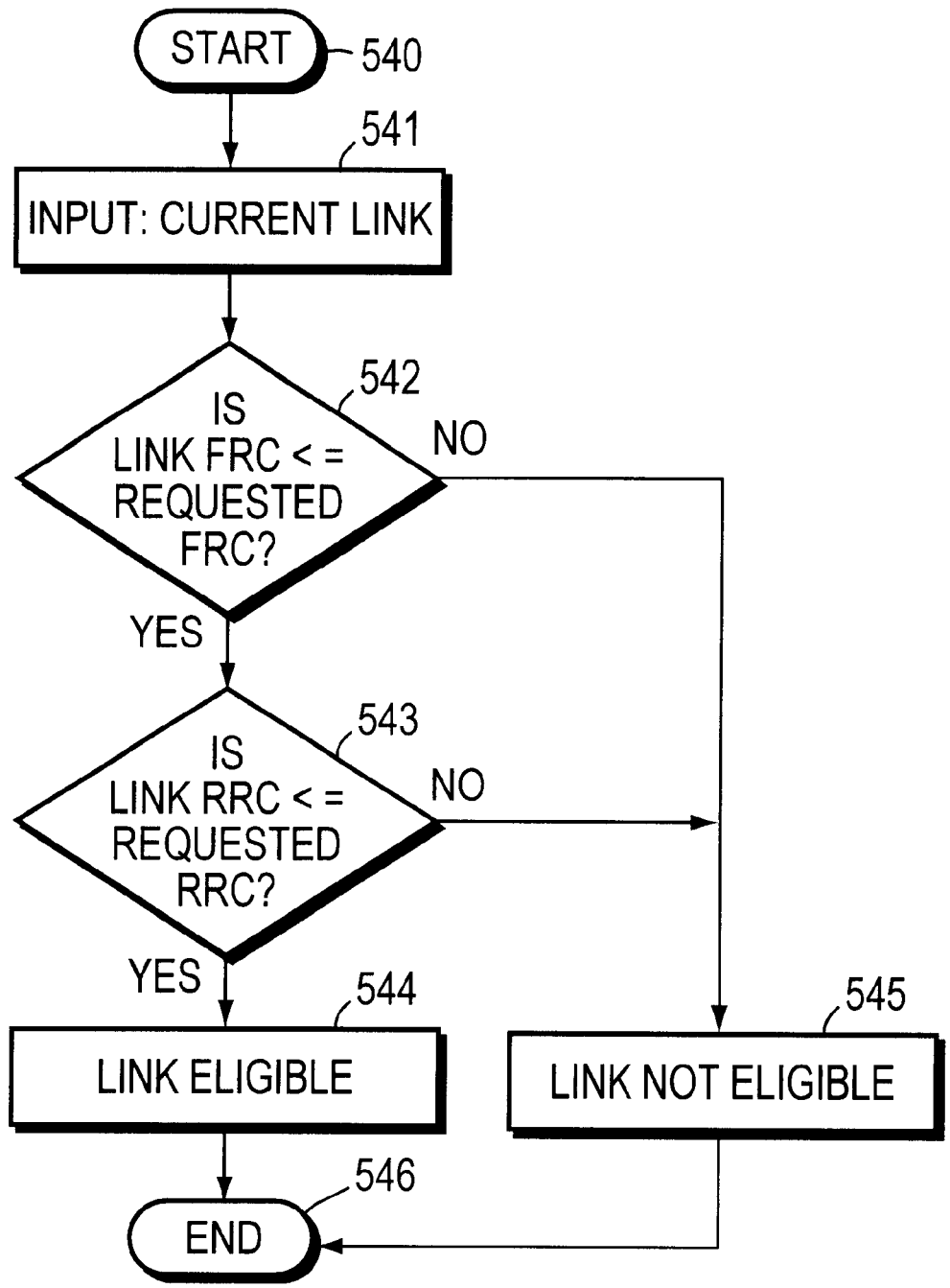
FIG. 6 shows a flow chart detailing the link eligibility decision step of FIG. 5.

FIG. 6 is a more detailed view of the link eligibility test of FIG. 5. Represented as box 54 of FIG. 5, the link eligibility test starts in start box 540 from which box 541 is entered for providing, as an input, the current link to be evaluated. Then, decision box 542 is entered to compare the forward restrictive cost associated to the current link (link FRC) to the forward restrictive cost requested by the incoming connection (requested FRC). If it is ascertained that the link FRC is not equal to or less than the requested FRC, box 545 is entered to declare the current link as not eligible. Conversely, if the link FRC is evaluated as being equal to or less then the requested FRC, decision box 543 is entered to compare the reverse restrictive cost associated to current link (link RRC) to the reverse restrictive cost requested by the incoming connection (requested RRC). If it is ascertained that the link RRC is not equal to or less than the requested RRC, box 545 is entered to declare the current link as not eligible. Conversely, if the link RRC is evaluated as being equal to or less than the requested FRC, decision box 544 is entered to declare the current link as eligible. Finally, the process ends at terminal box 546. In other words, the current link is eligible if both its forward and reverse restrictive costs are equal to or less than, respectively, the forward restrictive cost and the reverse restrictive cost required by the proposed connection. Current link FRC and RRC are provided by the topology database while connection FRC and RRC are provided by the connection call setup signalling protocol.

Figure 7:
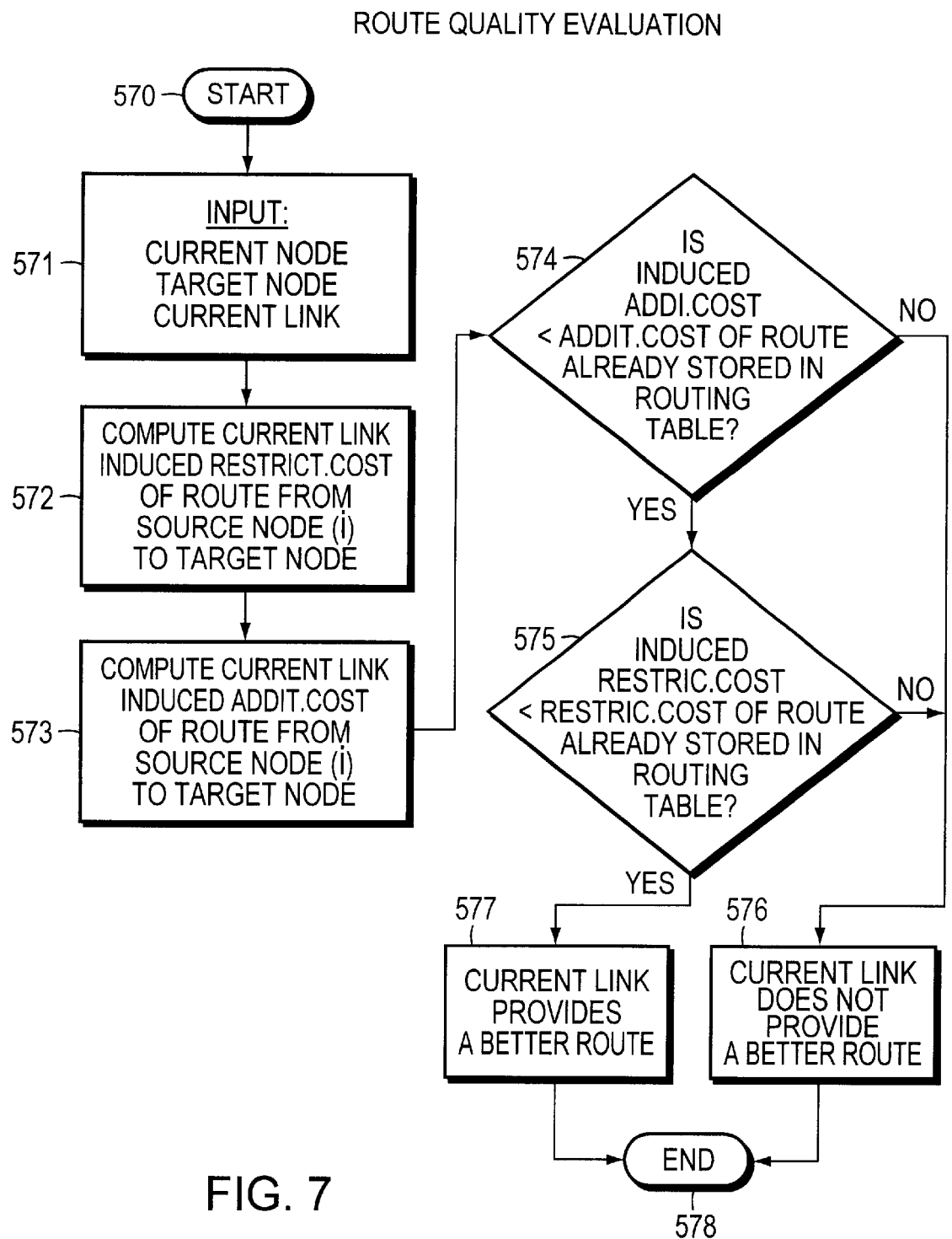
FIG. 7 shows a flow chart detailing the route quality evaluation step of FIG. 5.

FIG. 7 is a more detailed view of the "quality" evaluation step 57 in FIG. 5. FIG. 7 starts in start box 570 from which box 571 is entered to provide, as input to the process, the current node, the target node and the current link. The current node was determined at box 51 of FIG. 5, the current link was determined at box 52 of FIG. 5 and the target node at which current link terminates was determined at box 55 of FIG. 5. As a result of a previous pass of the FIG. 5 process, an optimal path from source node (i) to current node is already stored in the routing table at an entry corresponding to the current node ID. Furthermore, as the target node is already "added", the routing table already contains, at an entry corresponding to current target node ID, an optimal path from source node (i) to current target node which DOES NOT pass through current link, with associated restrictive cost (Restrict_Cost field) and associated additive cost (Additive_Cost field. Then, box 572 is entered to compute the overall restrictive cost induced by the current link to the path from source node (i) to target node through the current node and link. By definition this is the maximum of the symmetric restrictive cost of the path from source node (i) to current node (RC(path_to_current_node)) and current link's symmetric restrictive cost (RC(current_ link)). RC(path_to_current_node) is read from the routing table at entry current node ID (Restrict_Cost field), and RC(current_link) is read from the topology database. After the overall restrictive cost induced by current link is computed, box 573 is entered to similarly compute the overall additive cost induced by current link. This is accomplished by summing the additive cost of the path from source node (i) to current node, read from the routing table at entry corresponding to current node ID (Additive_Cost field), with the additive cost associated with current link, which is read from the topology database.

After both current link induced restrictive and additive costs have been calculated, decision box 574 is entered to compare the induced additive cost to the overall additive cost of the path already stored in the routing table at entry corresponding to target node ID. If the induced additive cost is not strictly less than the additive cost of the path already stored, then it is concluded that current link does not provide a better route (box 576). Conversely, if the induced additive cost is strictly less than the previously stored path additive cost, then box 575 is entered to perform a similar comparison between the induced restrictive cost and the previously stored path restrictive cost. Finally, a current link is declared as providing a better route (box 577) than the previously stored route only if both current link induced additive and restrictive costs are less than, respectively, the previously stored path additive and restrictive costs. The process ends at terminal box 578.

Returning to FIG. 5, if the current link provides a better route, box 58 is entered to update the routing table with the latter route computed from source node (i) to target node through the current link, as will be described further with reference to FIG. 9.

Figure 8:
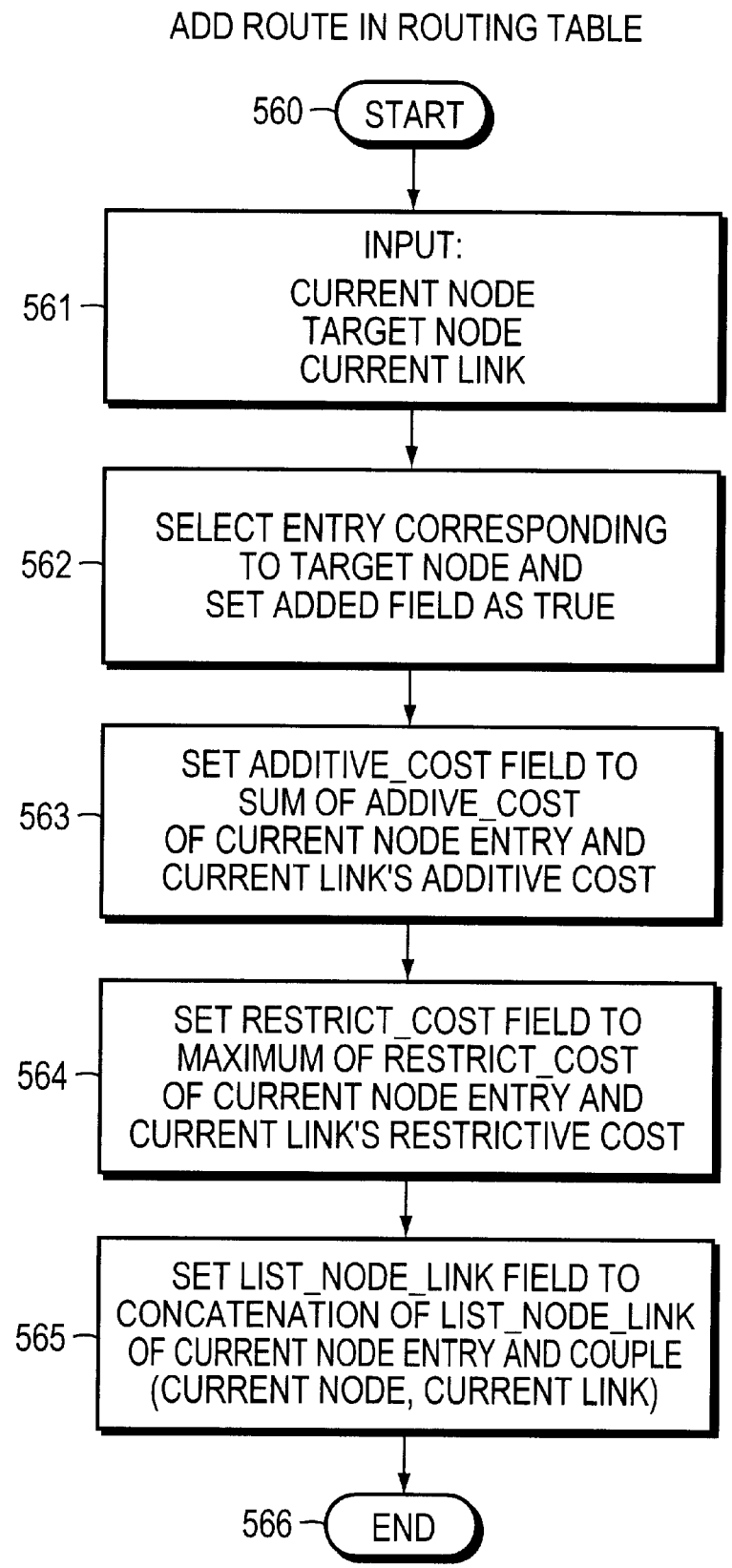
FIG. 8 shows a flow chart detailing the step in FIG. 5 of adding a route in the routing table.

FIG. 8 is a more detailed view of step 56 in FIG. 5. FIG. 8 starts in start box 560 from which box 561 is entered to provide, as input to the process, the current node, the target node, and the current link. Then, box 562 is entered to select, from the routing table, the entry corresponding to target node ID and set the "Added" field of this entry to "true", flagging the target node as "added". This flag is tested at decision box 55 of FIG. 5. This flag is also used in box 34 of FIG. 3 when retrieving the optimal path from source node (i) to destination node (j) to determine whether there is a feasible path stored in the routing table. After box 562 is passed, box 563 is entered to add the value stored in the Additive_Cost field of current node ID entry in the routing table to the additive cost associated to current link. The result of this addition is stored in the Additive_Cost field of the target node entry in the routing table. Then, box 564 is entered to store in the Restrict_Cost field of the target node entry of the routing table, the maximum value between the value stored in the Restrict_Cost field of current node entry in routing table, and the symmetric restrictive cost associated to current link. Finally, in box 565, the list of node/link stored in the List_Node_Link field of current node entry in routing table, is retrieved and concatenated with the couple (current node, current link). The result, which represents the overall path from source node to target node, is stored in field List_Node_Link of target node entry of the routing table. The process ends at terminal box 566.

Figure 9:
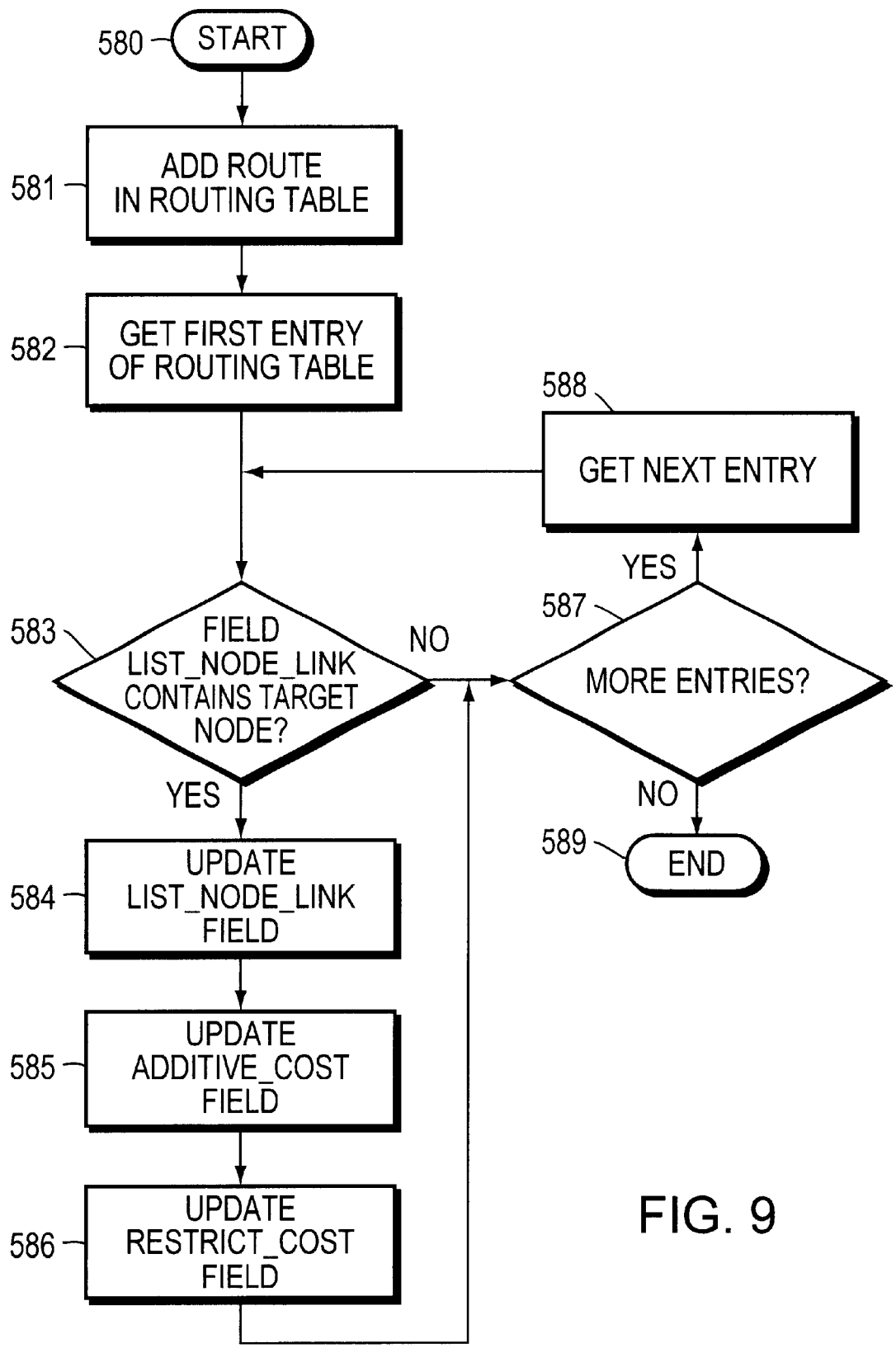
FIG. 9 shows a flow chart detailing the step in FIG. 5 of updating the routing table.

FIG. 9 is a flow chart detailing step 58 in FIG. 5 for updating the routing table with the last calculated optimal route from source node (i) to target node where a less suitable route was already stored in the routing table at the entry corresponding to the target node. FIG. 9 starts in box 580, from which box 581 is entered to add the route in the routing table. The operation of box 581 is identical to the process of adding a route in the routing table previously described with reference to FIG. 8. After the route has been added in the routing table at the entry corresponding to the target node (with corresponding restrictive and additive costs), box 582 is entered to retrieve the first entry of the routing table. Then, decision box 583 is entered to test whether the List_Node_Link field of the current entry contains the target node, i.e., whether the path from source node (i) to node Node_ID of the current entry goes through the target node. If not, decision box 587 is entered to determine if there are any more entries to process in the routing table. If so, the next entry is obtained in box 588 and the process recycles with decision box 583. If there are no more entries to process, the process terminates in end box 589.

Returning to box 583, if the List_Node_Link field of the current entry contains the target node, then box 584 is entered to update the path stored in the List_Node_Link field of the current entry. The path is updated as follows. The sequence of nodes/links from source node (i) to the link just before the target node (i.e. the link that connects to the target node), is replaced by the sequence of nodes/links that is stored in List_Node_Link field at the target node entry in routing table. Then, box 585 is entered to update the Additive_Cost field of the current entry with the additive cost stored at the target node entry as follows. All links of the path stored at current entry (field List_Node_Link) that make up the path from target node to the last node are identified, and their respective additive costs (retrieved from the topology database) are summed. This latter sum is added to the additive cost stored at the target node entry of routing table in order to obtain the overall additive cost of the path now updated, which is stored at the current entry of routing table. Once the new additive cost is calculated, box 586 is entered to update the Restrict_Cost field of the current entry with the restrictive cost stored at the target node entry. The update step first requires computation of the maximum value of the restrictive costs associated with the links that are included from target node to the last node in the updated path stored at the current entry. Then, the greater of this latter computed maximum value and the restrictive cost stored in the target node entry (field Restrict_Cost) of routing table is selected in order to obtain the overall restrictive cost of the path now updated, which is stored at current entry of routing table. After field Restrict_Cost of current entry is updated, decision box 587 is again entered to determine if there are any more entries to process in routing table. If so, the next entry is obtained in box 588, and the process recycles with decision box 583. If not, the process terminates at end box 589.

According to the invention, after optimal paths have been computed from source node (i) to all other nodes of the network, a routing table is available which contains all the paths with associated additive and restrictive costs. Then, the particular optimal path from source node (i) to destination node (j) is obtained by retrieving the path from field List_Node_Link at entry of the routing table corresponding to destination node (j). If the Added field in the entry corresponding to destination node (j) is "false", there is no feasible from source node (i) to destination (j). Consequently, the proposed connection is rejected.

One advantage of having computed all the optimal paths originating at the source node is that if a new connection is later set up from the same source node (i) to any node (n) of the network (and the topology of the network has not changed since the routing table was constructed), then the best path from the source node to node n can be immediately obtained by retrieving the path stored at entry corresponding to node n in the routing table.

The optimal path selected from the source node to the destination node is the widest path, that is, the path that has the lowest symmetric restrictive cost (i.e. the lowest maximum of the forward and reverse restrictive costs in the preferred embodiment of the invention). Furthermore, the optimal path selected is the shortest path, that is, the path that has the lowest additive cost. Having the lowest additive cost also includes having the minimal hop count since the additive cost increases with the number of links traversed. Consequently, the optimal path computed by the present invention can be referred to as "the widest shortest path".

In brief, as described above, the present invention provides a method and system for determining the optimal path for routing a communication in a communication network between a source node and at least one destination node. The determination is based upon evaluation of the path offering the widest bandwidth available with regard to the direction of data transmission, the lowest additive cost, and the lowest hop count. Each link of the network is associated with at least a restrictive cost and an additive cost reflecting selected link characteristics. A path is characterized by a restrictive cost and an additive cost derived from the link costs of its component links. A connection to be routed provides a source node, a destination node and a maximum restrictive cost allowed for routing the connection. Then, all the optimal paths from the source node to all the other nodes of the network are determined and stored. These paths are stored if they have the lowest restrictive cost that allows the routing of the connection, and if they have the lowest additive cost and minimum hop count. Finally, from the plurality of stored paths, the path that originates from the source node and terminates at the destination node is selected as the optimal path to route the connection.

While the invention has been described in terms of a preferred embodiment, those skilled in the art will recognize that the invention can be practiced with variations and modifications. Therefore, it is intended that the appended claims shall be construed to include both the preferred embodiment and all variations and modifications thereof that fall within the scope of the invention.

What is claimed is:

1. A system for determining the optimal communication path between a source node and at least one destination node in a communications network comprising a plurality of nodes interconnected by a plurality of links, said system comprising:

a topology database having a plurality of additive cost link characteristics and a plurality of restrictive cost link characteristics;

a selection procedure for selecting a subset of additive cost link characteristics and a subset of restrictive cost link characteristics reflecting selective link characteristics for each link of the network;

a connection request procedure for identifying, for a proposed connection, a source node, a destination node and a maximum allowable restrictive cost;

a cost computation procedure for computing for each path a restrictive cost and an additive cost derived from the link costs of the component links of the path;

a path computation procedure for determining and storing all the optimal paths from said source node to all the other nodes of the network, said paths having the lowest restrictive cost that is less than or equal to the maximum allowable restrictive cost allowed by the connection, and having the lowest additive cost; and a path selection procedure for selecting as the optimal path for the connection, the path from the plurality of stored paths that originates from said source node and terminates at said destination node.

2. The system according to claim 1 wherein said restrictive cost associated with each link of the network is a function of a forward restrictive cost which applies when the link is traversed in one direction, and of a reverse restrictive cost which applies when the link is traversed in the other direction.

3. The system according to claim 1 or 2 wherein said restrictive cost associated with each link is function of the available bandwidth of the link.

4. The system according to claim 1 or 2 wherein said additive cost associated with a link comprises an Administrative Weight.

5. The system according to claim 1 wherein said path computation procedure comprises a breadth-first approach.

6. The system according to claim 1 or 2 wherein said a cost computation procedure comprises:

a restrictive cost computation procedure for computing an overall restrictive cost of the path; and an additive cost computation procedure for summing additive costs of the links that are included in the path.

7. A method of determining the optimal path between a source node and at least one destination node in a communications network comprising a plurality of nodes interconnected by a plurality of links, said method comprising the steps of:

selecting additive cost link characteristics and restrictive cost link characteristics from a plurality of link characteristics;

associating each link of the network with at least a restrictive cost and an additive cost reflecting selected link characteristics;

identifying for a proposed connection, a source node, a destination node and a maximum allowable restrictive cost;

characterizing a path by a restrictive cost and an additive cost derived from the link costs of the component links of the path;

determining and storing all the optimal paths from said source node to all other nodes in the network, said paths having the lowest restrictive cost that is less than or equal to the maximum restrictive cost allowed by the connection, and having the lowest additive cost; and selecting, as the optimal path for the connection, the path in the plurality of stored paths that originates from said source node and terminates at said destination node.

8. The method according to claim 7 wherein said restrictive cost associated with each link of the network is function of a forward restrictive cost which applies when the link is traversed in one direction, and of a reverse restrictive cost which applies when the link is traversed in the other direction.

9. The method according to claim 7 or 8 wherein said restrictive cost associated with each link is function of the available bandwidth associated with the link.

10. The method according to claim 7 or 8, wherein said additive cost associated with a link comprises an Administrative Weight.

11. The method according to claim 7, wherein said step of determining and storing all the optimal paths comprises the step of utilizing a breadth-first approach.

12. The method according to claim 7 or 8, wherein said step of characterizing a path with a restrictive and an additive cost comprises the steps of:

determining the maximum of said restrictive costs associated with the links that are comprised in the path; and summing said additive costs of the links that are comprised in the path.

13. A computer readable medium comprising: instructions and data written thereon, said instructions and data containing information for the practice of the method of claim 7.

14. Electromagnetic signals travelling over a computer network comprising: said electromagnetic signals carrying information for the practice of the method of claim 7.

\* \* \* \* \*